United States Patent
Szolyga

(10) Patent No.: US 7,408,107 B2
(45) Date of Patent: Aug. 5, 2008

(54) KEYBOARD WITH AUDIO OUTPUT

(75) Inventor: Thomas H. Szolyga, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 584 days.

(21) Appl. No.: 11/007,571

(22) Filed: Dec. 7, 2004

(65) Prior Publication Data

US 2006/0117936 A1    Jun. 8, 2006

(51) Int. Cl.
*G10H 1/00*    (2006.01)
(52) U.S. Cl. .............................. 84/615; 84/653; 341/22; 341/27; 345/168; 700/84
(58) Field of Classification Search .................. 84/615, 84/653, 744; 341/22, 27; 345/168; 700/84
See application file for complete search history.

(56) References Cited

U.S. PATENT DOCUMENTS

| | | | |
|---|---|---|---|
| 5,717,430 A * | 2/1998 | Copland et al. ............. 345/168 |
| 6,170,024 B1 * | 1/2001 | Wakeland et al. ............. 710/38 |
| 6,268,806 B1 * | 7/2001 | Frager et al. .................... 341/22 |
| D458,606 S  * | 6/2002 | Tritschler et al. ........... D14/398 |
| 6,682,235 B2 * | 1/2004 | Monney et al. .............. 400/472 |
| 6,935,797 B2 * | 8/2005 | Sim ............................ 400/472 |
| 7,046,234 B2 * | 5/2006 | Ozolins ....................... 345/168 |
| 7,109,890 B2 * | 9/2006 | Sim .............................. 341/20 |
| 2005/0117712 A1 * | 6/2005 | De Sousa ................. 379/32.01 |
| 2007/0091551 A1 * | 4/2007 | Chen et al. ................... 361/680 |

* cited by examiner

*Primary Examiner*—Lincoln Donovan
*Assistant Examiner*—David S. Warren

(57) ABSTRACT

A keyboard provides an analog sound signal for a sound producing device. The keyboard includes an interface circuit that couples the keyboard to a digital sound source through a universal serial bus (USB) cable. The keyboard further includes an audio rendering circuit that receives digital sound samples from the interface circuit and converts the digital sound samples to an analog sound signal and a connector coupled to the audio rendering circuit that is configured to couple the analog sound signal to a sound producing device.

20 Claims, 1 Drawing Sheet

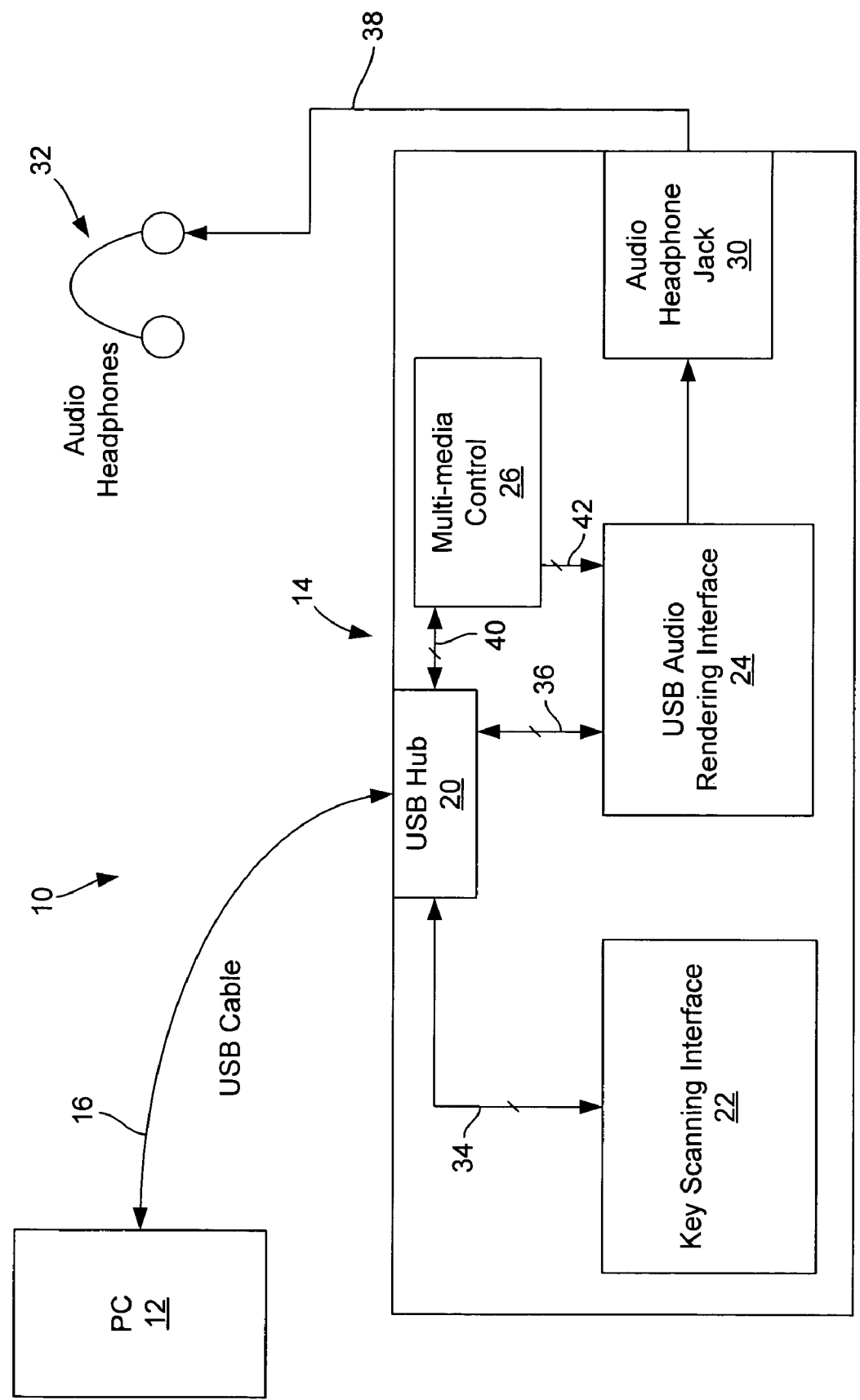

KEYBOARD WITH AUDIO OUTPUT

BACKGROUND OF THE INVENTION

Computers are well known that provide multi-media outputs. One such output is an analog audio output provided by a computer audio card.

If a set of headphones is to be connected to the computer to receive the audio output, it is necessary for the headphones to have an audio cable of sufficient length to reach from the operator's position to the computer. If the operator is working at the computer system keyboard, it is necessary for the audio cable to have a length longer than the keyboard cable length. Further, audio connections are generally provided on the backs of computer cabinets. Hence, computers on a floor, under a desk, or in a cabinet provide difficult connection challenges. Obviously, such situations are cumbersome at best.

One solution has been to provide the computer system keyboard with an audio headphone jack. A separate cable is then used to connect the keyboard headphone jack to the computer. While this would seemingly solve the problem, it still requires extra cabling from the keyboard to the computer. This can also make initial setup more complicated. Further, there is no standard requiring a computer to have an audio card or output capable of driving headphones at all. The present invention addresses these issues.

SUMMARY OF THE INVENTION

The invention provides a keyboard comprising an interface circuit that couples the keyboard to a digital sound source through a universal serial bus (USB) cable. The keyboard further comprises an audio rendering circuit that receives digital sound samples from the interface circuit and converts the digital sound samples to an analog sound signal and a connector coupled to the audio rendering circuit that is configured to couple the analog sound signal to a sound producing device.

The present invention further provides a method comprising generating digital sound samples, transferring the digital sound samples to a keyboard over a universal serial bus, converting, within the keyboard, the digital sound samples to an analog audio signal and providing the analog audio signal to an audio connector carried by the keyboard.

BRIEF DESCRIPTION OF THE DRAWING

The sole FIGURE is a general schematic representation of a computer system according to an embodiment of the present invention.

DESCRIPTION OF THE INVENTION

In the following detailed description of an exemplary embodiment of the invention, reference is made to the accompanying drawing, which forms a part hereof. The detailed description and drawing illustrate a specific exemplary embodiment by which the invention may be practiced. This embodiment is described in sufficient detail to enable those skilled in the art to practice the invention. It is understood that other embodiments may be utilized, and other changes may be made, without departing from the spirit or scope of the present invention. The following detailed description is therefore not to be taken in a limiting sense, and the scope of the present invention is defined by the appended claims.

Referring now to the sole FIGURE, it illustrates a computer system 10 according to an embodiment of the present invention. The computer system 10 includes a digital computer 12 and a keyboard 14. A universal serial bus (USB) cable 16 couples the keyboard 14 to the computer 12.

Universal serial busses are well known in the art. They conform to a connectivity specification developed by the USB Implementers Forum. The USB connectivity specification is aimed to permit peripherals to be readily connected to the computer. One such peripheral is the keyboard 14. USB cables can be utilized for carrying many different kinds of information including keyboard key selections, digitized photographic images, or digitized sound samples, for example. Hence, USB cables are well known in the art.

The keyboard 14 as will be noted in the sole FIGURE, includes a USB hub 20, a keyboard scanning interface 22, and a USB audio rendering interface circuit 24. The keyboard 14 further includes a multi-media control circuit 26 and an audio headphone jack 30. The audio headphone jack 30 is adapted for connection to an acoustic reproduction device such as a pair of audio headphones 32.

The key scanning interface 22 is of the type well known in the art. It provides keystroke selection information for use by the computer 12. The keystroke selection information is conveyed over a bus 34 to the USB hub 12 and then to the computer 12 over the USB cable 16.

The USB hub 20 provides an interface between the USB cable 16 and the various circuits of the keyboard 14. USB hubs are well known in the art and therefore need not be described in detail herein.

The USB audio rendering interface circuit 24 may also be of the type well known in the art. It is connected to the USB hub 20 over a bus 36. It receives the digital sound samples from the computer 12 and converts the digital sound samples to analog sound signals. The digital sound samples are conveyed to the USB audio rendering interface circuit 24 over the USB cable 16, through the hub 20, and over the bus 36.

The audio headphone jack 30 is coupled to the USB audio rendering interface circuit 24 for receiving therefrom the analog sound signal or audio output. It is adapted to receive a suitable audio connector carried by a headphone cable 38 for coupling the audio sound signal to the audio headphones 32.

The multi-media control 26 is coupled to the USB hub 20 over a bus 40 and to the USB audio rendering interface 24 over another bus 42. The control circuit 26 is of the type known in the art for controlling system audio volume, for example. The volume control, for controlling the amplitude of the audio output of the USB audio rendering interface circuit 24 may be by direct hardwire connection of bus 42 within the keyboard or by a software path from the control circuit 26, through the computer 12, and back to the USB audio rendering interface circuit 36. More specifically, the software path would traverse the bus 40, the USB hub 20, the USB cable 16, the computer 12, and return on the USB cable 16, the USB hub 20, and the bus 36 to the USB audio rendering interface circuit 24.

In this embodiment, an audio headphone output is added to the keyboard 14 without requiring a cable connection to the computer audio output jack. The keyboard connects to the computer through the USB cable 16. The USB hub provides internal USB ports for the keyboard electronics and the USB audio rendering interface circuit. When the keyboard is plugged into the computer, both USB devices (USB hub and USB audio rendering interface circuit) are recognized and appropriate device drivers are loaded by the computer operating system. The operator then may select the keyboard audio output as a desired audio destination. The operating system sends the digital audio samples across the USB cable 16, through the hub 20, and the bus 36 to the USB audio rendering interface circuit 24. The USB rendering interface circuit 24 buffers and converts the digital audio samples into an analog sound signal. The multi-media control 26 controls the amplitude of the output of the USB audio rendering interface circuit 24. The analog audio signal is then provided to the audio headphone jack 30 for connection to the headphone cable 38 to permit the operator to listen to the audio over the audio headphones 32.

Unlike previous keyboards with audio headphone jacks, the embodiment of the sole FIGURE provides the audio connection from the computer to the keyboard 14 without extra cabling. The keyboard does not require any special audio hardware in the computer. In fact, it is possible to completely eliminate all audio hardware in the computer with this embodiment of the invention if the user desires only headphone sound output. This would result in significant savings in system cost and complexity.

Although the present invention has been described in considerable detail with reference to certain preferred embodiments, other embodiments are possible. Therefore, the spirit or scope of the appended claims should not be limited to the description of the embodiments contained therein. It is intended that the invention resides in the claims.

I claim:

1. A keyboard, comprising:
   an interface circuit that couples the keyboard to a digital sound source through a universal serial bus (USB) cable and that receives a volume-control signal from the digital sound source;
   an audio rendering circuit that receives digital sound samples and the volume-control signal from the interface circuit, converts the digital sound samples to an analog sound signal, and varies an amplitude of the analog sound signal in response to the volume-control signal;
   a control circuit coupled to the audio rendering circuit that controls the volume of the analog sound signal by transmitting to the digital sound source via the interface circuit volume-control information from which the digital sound source generates the volume-control signal; and
   a connector coupled to the audio rendering circuit that is configured to couple the analog sound signal to a sound producing device.

2. The keyboard of claim 1 wherein the digital sound source is a digital computer.

3. The keyboard of claim 1 wherein the interface circuit comprises a USB hub.

4. The keyboard of claim 1 wherein the audio rendering circuit comprises a USB audio rendering interface.

5. The keyboard of claim 1 wherein the connector comprises an audio headphone jack.

6. The keyboard of claim 1 wherein the volume-control signal comprises a digital signal.

7. A computer keyboard comprising:
   a USB hub that couples the keyboard to a computer through a USB cable;
   a USB audio rendering interface circuit coupled to the USB hub that receives digital sound samples generated by the computer, that converts the digital sound samples to an analog audio output signal, and that adjusts an amplitude of the analog audio output signal in response to a volume-control signal received from the computer via the USB cable and USB hub;
   a control circuit that generates volume-control information from which the computer generates the volume-control signal and that routes the volume-control information to the computer via the USB hub and the USB cable; and
   an audio jack that is coupled to the USB audio rendering interface circuit and configured to couple the audio output signal to an acoustical sound reproduction device.

8. The keyboard of claim 7 wherein the audio jack comprises an audio headphone jack.

9. The keyboard of claim 7 wherein the volume-control signal comprises a digital signal.

10. The keyboard of claim 7 wherein the control circuit is hardwired coupled to the USB audio rendering interface circuit.

11. The keyboard of claim 7 wherein the volume-control information is in digital form.

12. A computer system comprising:
    a digital computer including a digital sound circuit;
    a USB cable coupled to the computer; and
    a keyboard comprising,
      a USB hub that couples the keyboard to the computer through the USB cable,
      a USB audio rendering interface circuit coupled to the USB hub that receives digital sound samples generated by the computer, that converts the digital sound samples to an analog audio output signal, and that adjusts an amplitude of the analog audio output signal in response to a volume-control signal received from the computer via the USB cable and USB hub;
      a control circuit that generates volume-control information from which the computer generates the volume-control signal and that routes the volume-control information to the computer via the USB hub and the USB cable; and
      an audio jack that is coupled to the USB audio rendering interface circuit and configured to couple the audio output signal to an acoustical sound reproduction device.

13. The system of claim 12 wherein the volume-control signal comprises a digital signal and the volume-control information is in digital form.

14. The system of claim 2 wherein the control circuit is hardwired coupled to the USB audio rendering interface circuit.

15. The system of claim 12 wherein the control circuit is software coupled to the USB audio rendering interface circuit through the USB audio cable and the computer.

16. The system of claim 12 wherein the audio jack comprises an audio headphone jack.

17. A keyboard comprising:
    interface means for circuit coupling the keyboard to a digital sound source through a universal serial bus (USB) cable;
    volume control means;
    audio conversion means for receiving digital sound samples from the interface means, converting the digital sound samples to an analog sound signal, and controlling an amplitude of the analog sound signal in response to a software path from the volume-control means, through the interface means, cable, and digital sound source, back through the cable and interface means, and to the audio conversion means; and
    connecting means coupled to the audio conversion means for coupling the analog sound signal to an acoustic sound producing device.

18. A method comprising:
    generating digital sound samples;
    transferring the digital sound samples to a keyboard over a universal serial bus;

converting, within the keyboard, the digital sound samples to an analog audio signal;

controlling an amplitude of the analog signal via a software path from the keyboard, through a computer to which the keyboard is coupled, and back to the keyboard; and providing the analog audio signal to an audio connector carried by the keyboard.

19. The method of claim 18 wherein controlling the amplitude of the analog signal comprises varying the amplitude of the analog audio signal from the keyboard vial the software path.

20. The method of claim 18 wherein the audio connector is an audio headphone jack.

\* \* \* \* \*

UNITED STATES PATENT AND TRADEMARK OFFICE
CERTIFICATE OF CORRECTION

PATENT NO. : 7,408,107 B2  Page 1 of 1
APPLICATION NO. : 11/007571
DATED : August 5, 2008
INVENTOR(S) : Thomas H. Szolyga It is certified that error appears in the above-identified patent and that said Letters Patent is hereby corrected as shown below:

In column 4, line 40, in Claim 14, delete "claim 2" and insert -- claim 12 --, therefor.

In column 6, line 3, in Claim 19, delete "vial" and insert -- via --, therefor.

Signed and Sealed this

Twenty-third Day of December, 2008

JON W. DUDAS
*Director of the United States Patent and Trademark Office*